United States Patent [19]
de Halleux et al.

[11] Patent Number: 5,963,031
[45] Date of Patent: Oct. 5, 1999

[54] METHOD AND APPARATUS FOR MEASURING THE THICKNESS OF A NON-FERROMAGNETIC CONDUCTIVE LAYER ON A FERROMAGNETIC CONDUCTIVE SUBSTRATE

[75] Inventors: Benoit de Halleux, Wavre; Bruno de Limburg Stirum, Huldenberg, both of Belgium

[73] Assignee: N.V. Bekaert Naamloze Vennootschap, Zwevegem, Belgium

[21] Appl. No.: 08/981,944

[22] PCT Filed: Jun. 18, 1996

[86] PCT No.: PCT/EP96/02627

§ 371 Date: Mar. 16, 1998

§ 102(e) Date: Mar. 16, 1998

[87] PCT Pub. No.: WO97/01739

PCT Pub. Date: Jan. 16, 1997

[30] Foreign Application Priority Data

Jun. 29, 1995 [EP] European Pat. Off. .............. 95201784

[51] Int. Cl.$^6$ .............................. G01B 1/00; G01B 7/06; G01B 7/10; G01N 27/72
[52] U.S. Cl. ............................................ 324/230; 324/233
[58] Field of Search ...................................... 324/229, 230, 324/231, 233, 234, 236, 262, 649, 650, 654

[56] References Cited

U.S. PATENT DOCUMENTS

| | | |
|---|---|---|
| 3,693,075 | 9/1972 | Forster . |
| 5,341,678 | 8/1994 | Kervinen . |
| 5,453,689 | 9/1995 | Goldfine et al. . |
| 5,461,313 | 10/1995 | Bohon . |

FOREIGN PATENT DOCUMENTS

| | | |
|---|---|---|
| 0 321 111 | 6/1989 | European Pat. Off. . |
| 2534015 | 4/1984 | France . |

OTHER PUBLICATIONS

Moulder et al., (1992) Thickness and conductivity of metallic layers from Eddy current measurements. Review of Scientific Instruments 63(6):3455–3465.

Patent Abstracts of Japan vol. 13, No. 64 (p. 827) (1989) & JP A 63 253212 (1988).

*Primary Examiner*—Walter E. Snow
*Attorney, Agent, or Firm*—Knobbe, Martens, Olson & Bear LLP

[57] ABSTRACT

Method, applicable to an object consisting of a substrate made of ferromagnetic electrically conductive material covered with a layer of a non-ferromagnetic electrically conductive coating, for measuring the product of the layer conductivity times the layer thickness, consisting in placing at least one inductor producing a variable magnetic field in a space neighboring the object, in measuring, by means of a detector consisting of at least one bounded detection surface, two quantities proportional to the parts of the time derivative of the magnetic flux created in the detection surface concomitantly by the inductor and by the object, in phase and in quadrature with a reference electrical signal, in concomitantly employing two different functions of these two measurements by defining an experimental point by taking these two functions as the two input quantities of a first chart which cannot be reduced to an equivalent chart with a single input, which is independent of the conductivity of the layer and of the conductivity and the permeability of the substrate, but is dependent on the characteristics of the inductor/object/detector system and on the variable magnetic field produced by the inductor, the said chart consisting of a network of non-secant curves which each correspond to a different value of the product of the layer conductivity times the layer thickness, and in determining on the chart which of these curves passes through the point corresponding to the measurement and deducing therefrom the value of the product of the layer conductivity times the layer thickness.

38 Claims, 7 Drawing Sheets

METHOD AND APPARATUS FOR MEASURING THE THICKNESS OF A NON-FERROMAGNETIC CONDUCTIVE LAYER ON A FERROMAGNETIC CONDUCTIVE SUBSTRATE

SUBJECT OF THE INVENTION

The present invention relates to a method and an installation for using eddy currents to measure the thickness of a coating layer of non-ferromagnetic conductive material on a substrate made of ferromagnetic conductive material.

TECHNICAL BACKGROUND ON WHICH THE INVENTION IS BASED

Covered metals are used in a wide variety of technical applications. The purpose of the covering is to improve the working properties of the product such as, for example, the generalized corrosion resistance, the fatigue strength, the electrical contact resistance, the thermal insulation etc. By way of example and without limitation, products which may be mentioned are galvanized steels, cadmium-plated bolts, and ferromagnetic conductive products covered with a film of silver or gold or another precious metal.

In order to guarantee that the covering skin has the desired effect on the working properties of the product, it must be possible to accurately check the characteristics of the coating giving rise to the desired effect. It is necessary, for example, to be capable of accurately determining the thickness of the covering skin, it being possible for the latter to vary from very small values (for example ¹⁄₁₀ or ¹⁄₁₀₀ of a micron) to relatively large values (for example 1 mm). The electrical conductivity σ must sometimes also be determined. Finally, it is sometimes also necessary to check the uniformity of the covering layer and, where appropriate, its integrity. It is advantageous if all these measurements can be carried out without contact with the article, for example in order to make it possible to introduce these inspection techniques on-line into the production process.

Numerous methods have been developed and applied for measuring the thickness of a layer deposited on a conductive support.

There are known chemical industrial methods for determining the thickness of a coating on a product. It should be noted that these methods have the major drawback that they are destructive and therefore cannot be applied on-line on production lines.

Other methods, such as the use of ultrasound or measuring the absorption or diffraction of ionizing radiation have been proposed for determining the thickness of a thin layer deposited on a substrate.

Other methods, carried out by measuring eddy currents, have also been described in the scientific literature or in patents.

In particular, the document "Thickness and Conductivity of Metallic Layers from Eddy Current Measurements", Rev. Sci. Instrum. 63 (6), June 1992, pp. 3455–3465 and the document FR-A-83 15 587 describe methods for measuring a non-ferromagnetic covering on non-ferromagnetic substrates.

The document "Utilisation de l'inversion de modèles courants de Foucault pour mesure de l'épaisseur de zinc sur aciers galvanisés" [Use of eddy-current model inversion for measuring the thickness of zinc on galvanized steels], comptes-rendus de la 6ᵉmeConférence sur les contrôles non destructifs, [Proceedings of the 6th conference on non-destructive testing] Nice, October 1994, pp. 1325–1329 and patents EP-A-0 179 720 and FR-A-83 12 980 describe methods and devices for measuring the thickness of thin metallic layers deposited on a conductive support.

However, all these methods are sensitive to the quality of the ferromagnetic conductive substrate, such as, for example, the conductivity and/or permeability.

Furthermore, in order to obtain reliable measurements, all cases require calibration to be carried out in order to make measurement possible.

All the documents referred to above describe methods which, during the measurement, employ only a single data item, such as, for example, the inductance, resistance or else the angle between the inductance and the resistance.

All existing methods for measuring the thickness of conductive layers coating conductive substrates therefore have drawbacks which limit their field of application, which cause measurement inaccuracies and which, when the methods are applicable, require very stringent checks that the geometrical, electrical and magnetic characteristics of the material are invariant. Rigorous control of the constancy of these characteristics is virtually impossible in an industrial environment.

OBJECTS OF THE INVENTION

The present invention proposes to provide a method and an installation making it possible to avoid the drawbacks mentioned above. It introduces a method for measuring the thickness of a conductive layer on a ferromagnetic conductive substrate.

The present invention aims to provide a method which accommodates variation in conductivity and in permeability of the substrate. The method is applicable to all products made of a ferromagnetic conductive material covered with a layer of non-ferromagnetic conductive material.

Particularly advantageous applications of the invention consist in measuring the thickness of metal, such as a tin, brass, zinc, gold or silver coating, electrolytically deposited on an object consisting of a substrate made of ferromagnetic conductive material, preferably chosen from the group consisting of a wire, a metal sheet, a tube, a section, a flat product or else any object bounded by a cylindrical surface or by a plane surface.

Among these advantageous applications, mention may be made of measuring the thickness of the zinc layer on a steel core wire, measuring the thickness of the zinc layer on the external surface and/or internal surface of galvanized steel pipes as well as in the on-line measurement of the thickness of the zinc layer in the case of wires, round bars, sections, tubes (internal or external layer) sheet metal and hot-galvanized or electrolytically galvanized flat products.

The present invention also aims to obviate any calibration in order to permit direct on-line measurement of the thickness of the covering on the conductive substrate.

PRINCIPAL CHARACTERISTIC ELEMENTS OF THE PRESENT INVENTION

The method according to the invention is applicable to an object consisting of a substrate made of ferromagnetic electrically conductive material covered with a layer of a non-ferromagnetic electrically conductive coating, for measuring the product of the layer conductivity times the layer thickness. The said method according to the invention consists in placing at least one inductor producing a variable magnetic field in a space neighbouring the object, in measuring, by means of a detector consisting of at least one bounded detection surface, two quantities proportional to the parts of the time derivative of the magnetic flux created in the detection surface concomitantly by the inductor and by the object, in phase and in quadrature with a reference electrical signal, in concomitantly employing two different functions as these two measurements by defining an experimental point by taking these two functions as the two input quantities of a first chart which cannot be reduced to an equivalent chart with a single input, which is independent of the conductivity of the layer and of the conductivity and the permeability of the substrate, but is dependent on the characteristics of the inductor/object/detector system and on the variable magnetic field produced by the inductor, the said chart consisting of a network of non-secant curves which each correspond to a different value of the product of the layer conductivity times the layer thickness, and in determining on the chart which of these curves passes through the point corresponding to the measurement and deducing therefrom the value of the product of the layer conductivity times the layer thickness.

According to the invention, the variable magnetic field may be obtained by keeping an inductor fixed in the laboratory reference frame and producing a time-variable inductor effect in the space neighbouring the object, the inductor consisting, for example, of a coil supplied with variable current or of an electromagnet supplied with a variable current. For example, this variable current may or may not be periodic, may or may not be alternating (for example pulsed), may be sinusoidal or may be of a different form. The variable magnetic field may also be produced in the space neighbouring the object by producing a magnetic field, which may or may not be time-invariant, in a reference frame which is in motion relative to the laboratory reference frame, such as, for example, a magnet or a coil linked with a rotating reference frame.

Another advantage of the method according to the invention consists in that the position of the experimental point in a second two-input chart is also used for determining the quotient of the conductivity of the substrate divided by the permeability of the substrate by employing this second two-input chart superposed with the first chart which cannot be reduced to an equivalent chart with a single input, which consists of a second network of non-secant curves which each correspond to a different value of the said quotient, which is independent of the conductivity of the layer and of the conductivity and the permeability of the substrate but is dependent on the particular geometry of each inductor/object/detector system, and in determining on the second chart which of these curves passes through the point corresponding to the measurement and deducing therefrom the value of the quotient of the permeability of the substrate divided by the conductivity of the substrate.

Another aspect of the invention consists in that it is applicable in real time and its use on-line may therefore be envisaged with the aim of providing feedback control making it possible to regulate manufacture.

Another aspect of the invention relates to an installation for measuring the thickness of a layer of non-ferromagnetic conductive material on an object consisting of a substrate made of ferromagnetic conductive material, the said object moving continuously through a measuring device comprising an inductor which produces a variable magnetic field in a space neighbouring the object, a detection system comprising a detector consisting of at least one bounded detection surface, the inductor and/or the detection system being connected to a computer programmed so as to carry out the measurement method according to the invention.

An outstanding characteristic of the invention is the very high accuracy and the very high reproducibility of the layer thickness measurements which can be achieved. The accuracy and the reproducibility of a measurement may be better than one tenth of a micron and, in some cases, one hundredth of a micron.

The method according to the invention preferably employs the information delivered by a known excitation coil supplied with, for example, a variable current and, without implying any limitation, a sinusoidal alternating current or a pulsed current, which is placed in the vicinity of the ferromagnetic conductive object covered with a layer of non-ferromagnetic conductive material, or the information delivered by one or more receive coils placed in the vicinity of the object through which eddy currents flow. The currents induced in the conductive object (eddy currents) are distributed in the covering layer and the adjacent region of the ferromagnetic part of the object. The existence of these currents generates an electromotive force in the turns of the coils in the vicinity of the conductive object. The measurement employs either the complex impedance which the excitation coil presents to the variable measurement current, or, in the case of a receive coil which is separate from the inducing coil, the respective variations in the voltage and phase appearing at the terminals of the receive coil, or equivalent methods. Two independent information items are thus available during each measurement, and these should be best employed in order to try to solve the problem of determining the thickness of the covering layer.

When the measurement is taken using a single coil, these two information items may advantageously be presented by likening the physical model to an R-L circuit. In order to overcome as far as possible the intrinsic characteristics of the coil and in order to consider only the quantities associated with the eddy currents which are generated in the object subjected to the test, the normalized inductance L and the normalized resistance R will be determined during each measurement, these being respectively defined by the following equations:

$$L = \frac{\omega L}{\omega L_v} \quad (1)$$

$$R = \frac{R - R_v}{\omega L_v} \quad (2)$$

$L_v$ and $R_v$ respectively represent the inductance and the resistance of the inducing coil when placed far away from any conductive object, $\omega$ represents the angular frequency ($2\pi f$), L and R respectively represent the inductance and the resistance of the inducing coil when in the vicinity of the conductive object covered with a conductive coating.

In order to facilitate understanding of the inventive approach, we will start by discussing the non-limiting exemplary case of measuring the thickness of the zinc layer using a measuring coil encircling an electrolytically galvanized wire.

The solution of the direct problem by using the exact model of Dodd and Deeds leads to the analytical relationships (3) and (4) relating the inductance L and the resistance R to the parameters of the physical model. These parameters are the internal and external cross-sections $S_1$, $S_2$ and the length 1 of the cylindrical coil, the diameter 2a of the galvanized wire, the frequency f of the measurement current, the thickness e of the galvanization layer, the conductivity $\sigma_1$ of the zinc layer, and the conductivity $\sigma_2$ and the relative permeability $\mu_{r2}$ of the steel core wire. All these variables appear explicitly in the analytical expressions corresponding to equations (3) and (4).

$$L = \text{function } (S_1, S_2, a, f, e, \sigma_1, \sigma_2, \mu_{r2}) \quad (3)$$

$$R = \text{function } (S_1, S_2, a, f, e, \sigma_1, \sigma_2, \mu_{r2}) \quad (4)$$

The values of the frequency f of the measurement current, the internal and external cross-sections $S_1$, $S_2$ and the length 1 of the solenoid, as well as the radius a of the galvanized wire, may be assumed to be known. Determination of the thickness e of the zinc layer then requires knowledge of the conductivities $\sigma_1$ and $\sigma_2$ as well as the permeability $\mu_{r2}$. We therefore have 4 unknowns, whereas we only have 2 equations if we measure the complex impedance Z at a single frequency. The object of the invention will be to solve this apparently insoluble problem. Taking the measurement at two or more frequencies does not make it possible to resolve this indeterminacy because experiments show that the permeability $\mu_{r2}$ of the ferromagnetic substrate depends on the frequency of the measurement current.

Equations (5) and (6) collate the results acquired on exploring the hidden properties; they are almost exact above a minimum frequency which depends on the parameters of the physical system constituted by the ferromagnetic product covered with a conductive layer, plus the measuring coil affected by the presence of this product. It is apparent that the variables e, $\sigma_1$, $\mu_{r2}$ and $\sigma_2$ are no longer present individually in equations (5) and (6) but in the form of the product $e^*\sigma_1$ and the quotient $\mu_{r2}/\sigma_2$. The variables $e^*\sigma_1$ and $\mu_{r2}/\sigma_2$ appearing in equations (5) and (6) are hidden variables. They do not appear explicitly in the analytical expressions corresponding to equations (5) and (6)

$$L = \text{function } (S_1, S_2, a, f, e, e^*\sigma_1, \mu_{r2}/\sigma_2) \quad (5)$$

$$R = \text{function } (S_1, S_2, a, f, e, e^*\sigma_1, \mu_{r2}/\sigma_2) \quad (6)$$

We now have 2 independent equations which allow us to determine the 2 unknowns $e^*\sigma_1$ and $\mu_{r2}/\sigma_2$.

Employing equations (5) and (6) makes it possible to establish, for each value system of the parameters $S_1$, $S_2$, a, f, a chart such as the one presented by way of non-limiting example in FIG. 1, which makes it possible to determine the respective values of the 2 variables $e^*\sigma_1$ or and $\mu_{r2}/\sigma_2$. FIG. 1 relates to the case in which the coil is a circular current sheet exactly matching the external surface of the galvanized wire.

In practice, in order to employ the complex impedance measurement taken at a fixed frequency which is high enough for the described beneficial properties to exist, it will be sufficient to search for the curve $e^*\sigma_1$=constant which passes through the point having the co-ordinates L and R of the representative point in the corresponding normalized impedance diagram. This search may be carried out using charts stored in memory or by direct calculation using the equations of the model. The respective values of the product $e^*\sigma_1$ and of the ratio $\mu_{r2}/\sigma_2$ will thus be obtained. The value of the thickness e is deduced from knowledge of the product $e^*\sigma_1$ by introducing therein the conductivity $\sigma_1$, which is assumed to be known.

It should be noted that, according to a preferred embodiment, the measurements are advantageously taken using a long solenoid having a single layer of turns. This is because in this case the measurements are less sensitive to the effects of vibration and centering.

DESCRIPTION OF SEVERAL PREFERRED EMBODIMENTS OF THE PRESENT INVENTION

Figure 1:
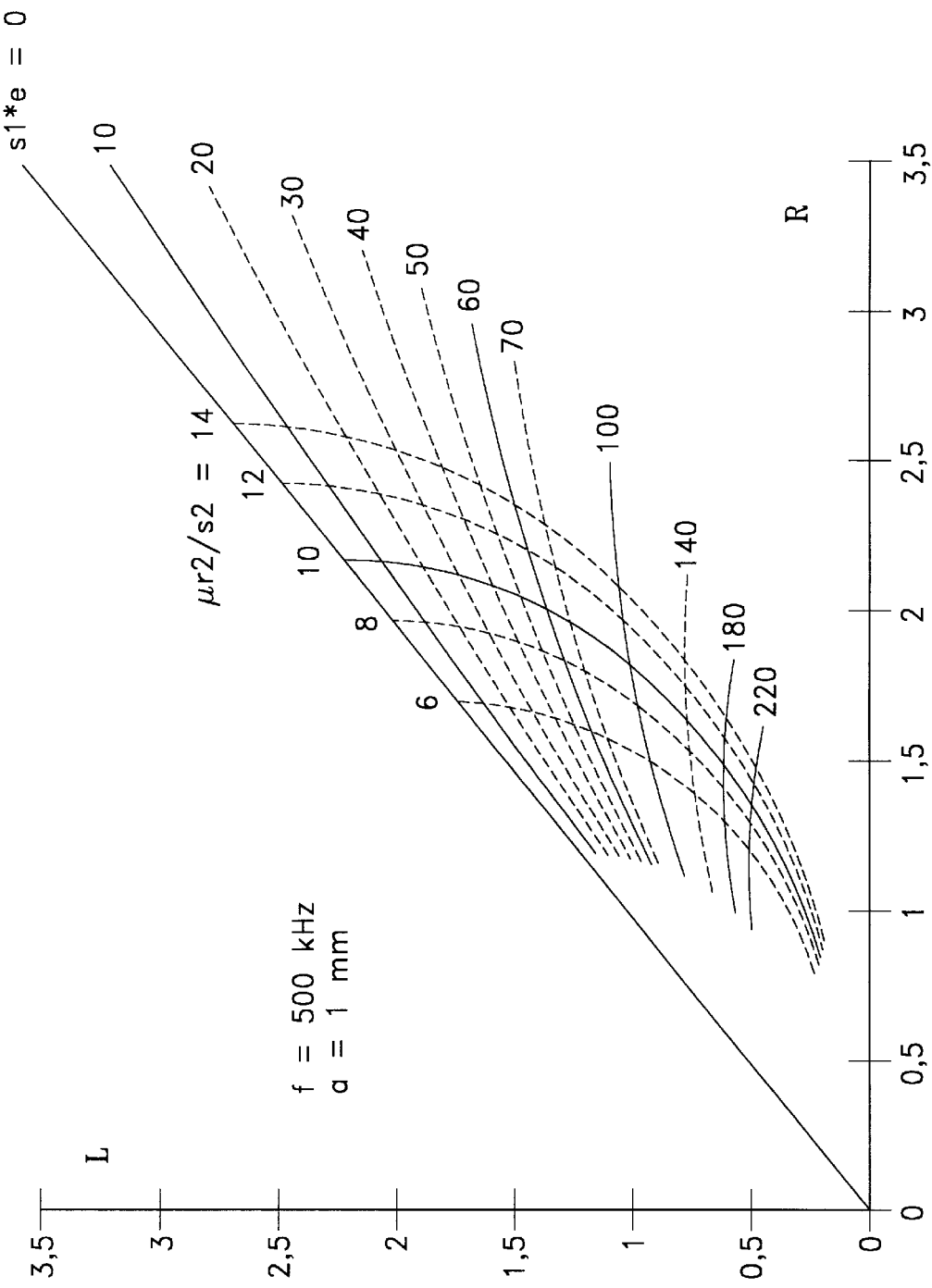
FIG. 1 represents the theoretical chart which makes it possible to use the complex impedance measurement taken at a fixed frequency to determine the product of the thickness $e^*\sigma_1$ for the covering layer.

The solution, presented in FIG. 1, derived from the Dodd and Deeds equations lends itself to an experimental verification which we will present below.

Figure 2:
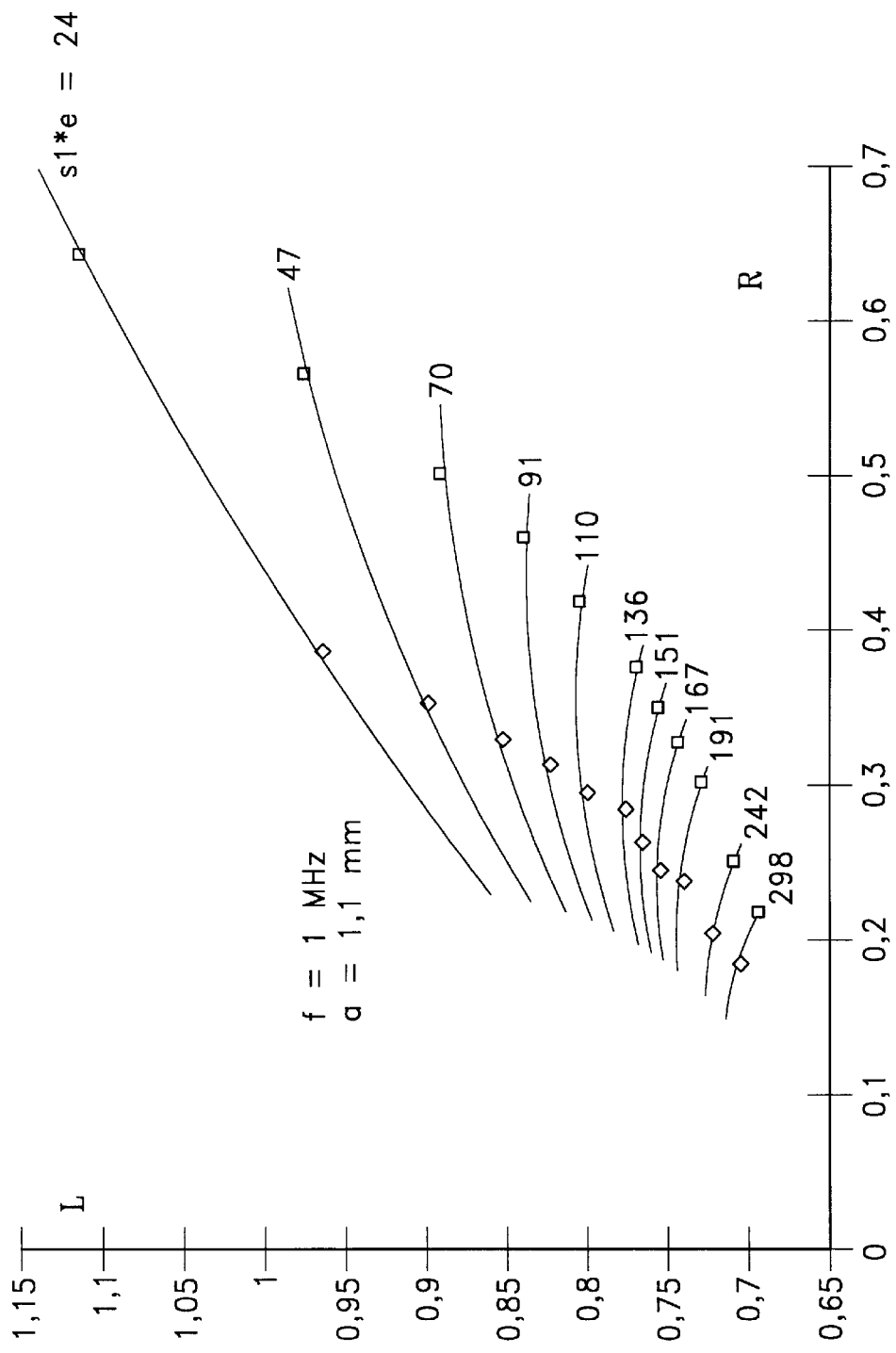
FIG. 2 represents the theoretical curves $e^*\sigma_1$=constant and the corresponding experimental values, on the one hand, in the case without magnetization and, on the other hand, in the case of a uniform axial magnetization by a magnetizing field.

FIG. 2 relates to the measurements taken at 1 MHz on 11 electrolytically zinc-plated wires with a diameter of 2.2 mm and covered with a zinc layer ranging from 2.8 $\mu$m to 21.1 $\mu$m. The 11 galvanized wires were subjected to measurement in two states, firstly with zero magnetization (squares), and subsequently with a uniform axial magnetization of 3330 A/m (diamonds). The results of the measurements are collated in Table 1 and allowed us to establish the diagram in FIG. 2. It is observed that the variation in permeability $\mu_{r2}$ caused by the magnetization of the galvanized wires causes a large displacement of the points in the normalized impedance diagram, and also that this displacement actually takes place along the curve according to which theory predicts that, above a certain frequency, it should occur. By joining the points corresponding to the measurements taken without magnetization and by joining the points corresponding to the measurements taken with magnetization, two curves approximating the theoretical curves $\mu_{r2}/\sigma_2$=constant are obtained, which also makes it possible to determine this ratio on the chart.

The result of this experiment with the same wires in the (unmagnetized) reception state and in the magnetized state, proves the accuracy of the theory and of the charts which are derived therefrom. This experiment further demonstrates that both L and R are not in one-to-one relation with the thickness of the covering layer. It is their combination, effected in the chart, which is in one-to-one relation with the layer thickness.

Figure 3:
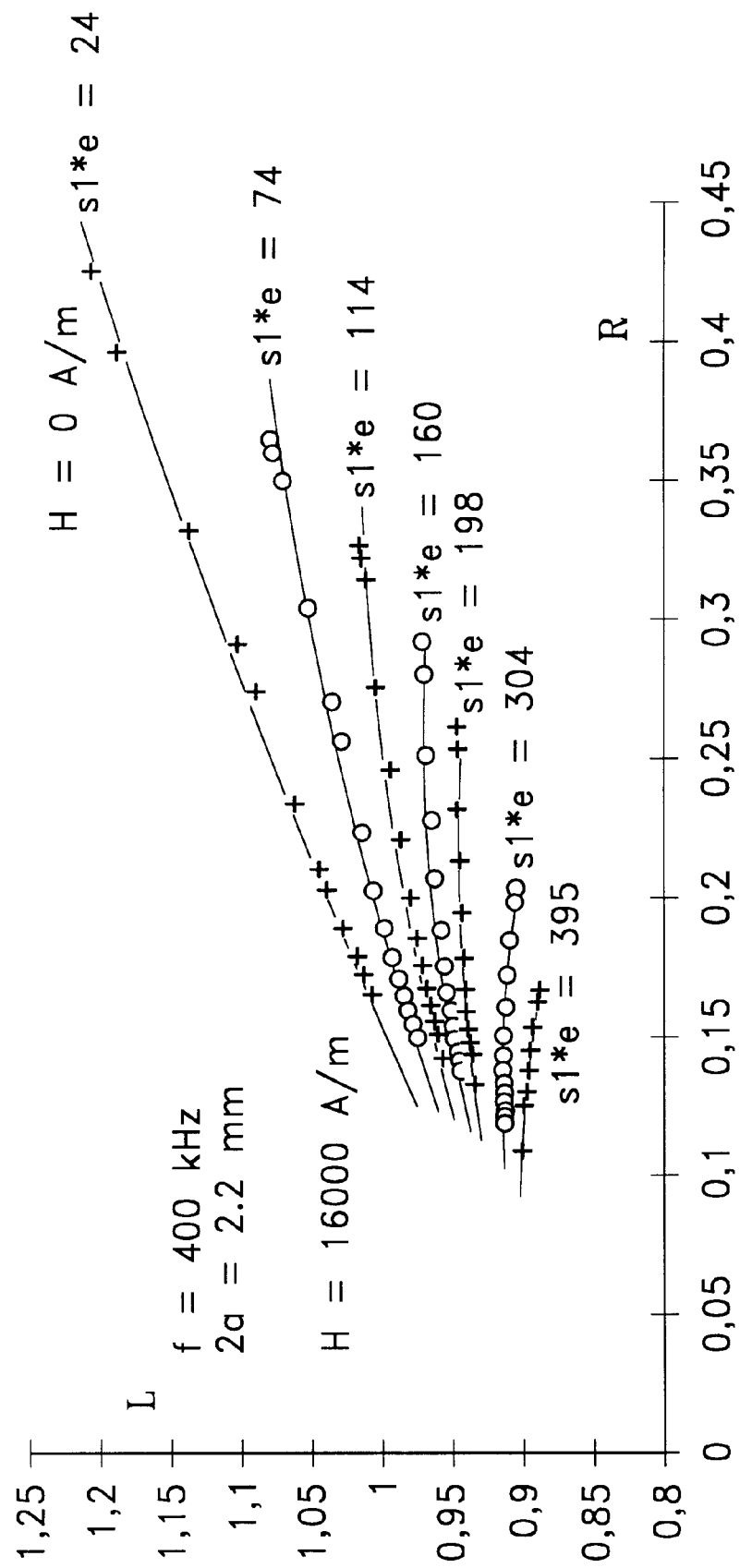
FIG. 3 represents the experimental chart obtained at a fixed frequency for a fixed geometry by taking a series of measurements with an increasing magnetization.

FIG. 3 represents an experimental chart obtained directly from a series of measurements taken with a fixed geometry, that is to say, in the case of the example, with a single solenoid and a well-defined wire diameter. This experimental chart is obtained by progressively magnetizing the electrolytically galvanized wires subjected to the measurement and by plotting the points corresponding to the successive measurements in the normalized impedance diagram. The value of the parameter $e^*\sigma_1$ characterizing each curve on the chart is obtained by multiplying the known thickness e by the conductivity $\sigma_1$ of the deposited zinc. The various curves on the chart were determined by polynomial regression. This chart, relating to a defined frequency, can be used with the same coil to determine the value of the product $e^*\sigma_1$ of electrolytically covered wires having the same diameter, regardless of the conductivities $\sigma_1$ of the conductive layer and $\sigma_2$ of the ferromagnetic substrate, as well as the permeability $\mu_{r2}$ of the latter.

Figure 4:
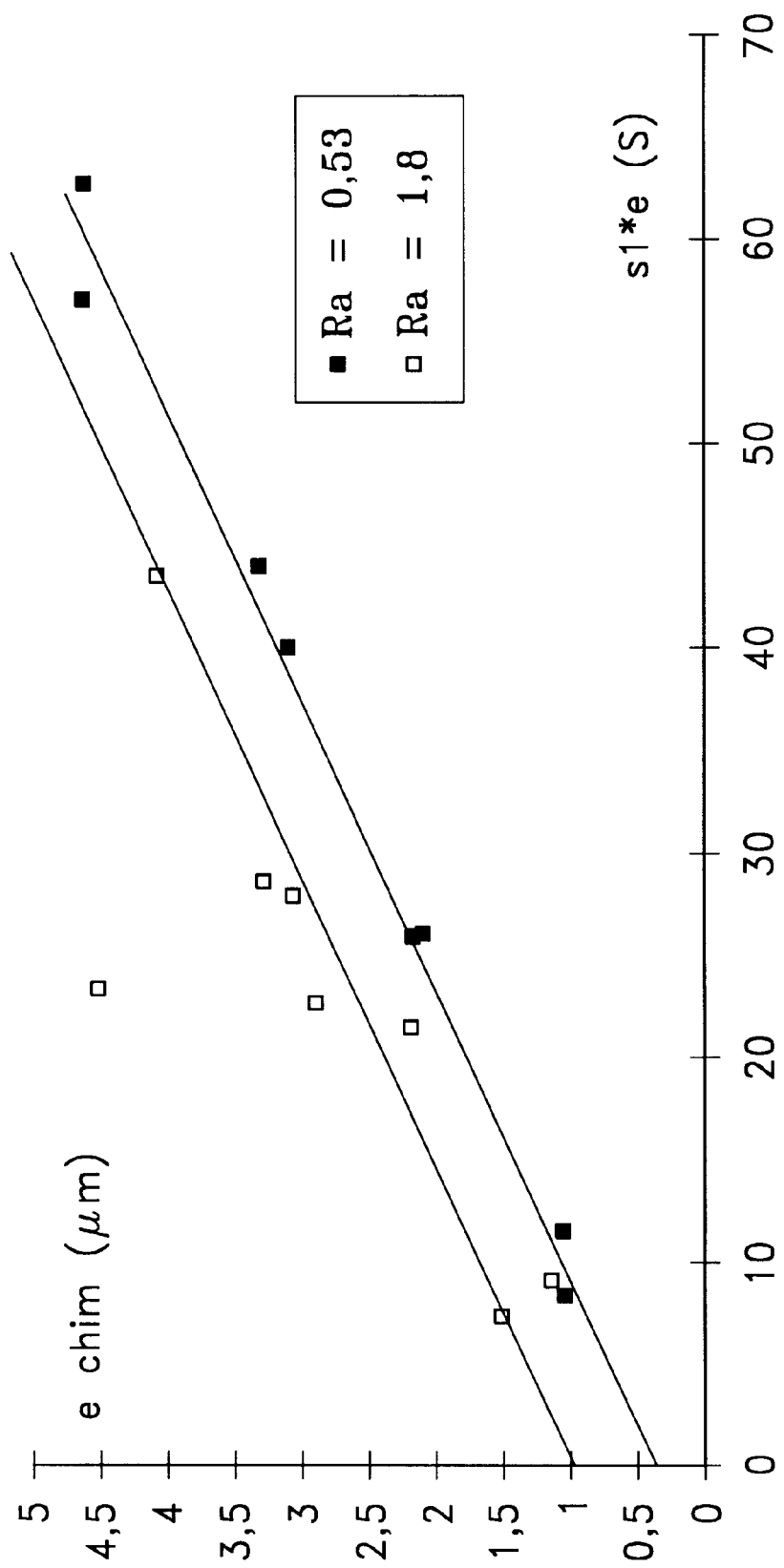
FIG. 4 represents the result of the eddy-current measurements on two families of wires having different surface roughnesses.

We also found experimentally that interpretation of the measurements requires the surface roughness of the core wire to be taken into account. There should be a proportional relationship between the thickness of the is zinc layer, determined by chemical means, and the product $e^*\sigma_1$ determined using eddy currents. The relationship is in fact linear without being proportional. In a diagram in which the ordinate is the thickness e determined by chemical means and the abscissa is the product $e^*\sigma_1$ determined using eddy currents, the y-intercept is not zero but has a value which may be of the order of a micron or a fraction of a micron. The experiments on electrolytically zinc-plated wires which we will present below make it possible, in this case, to attribute this difference from proportionality to the surface roughness $R_a$ of the core wire. The theory assumes that the paths of the eddy currents are circular in the case of a core wire with circular cross-section. However, because of the surface roughness of the core wire, these assumptions are not accurately satisfied and it should therefore be expected that the thickness, determined by chemical means, which takes into account all the zinc covering the core wire, will be slightly greater than the thickness determined using eddy currents. This is because the zinc lying in the relief hollows on the surface of the core wire is virtually undetected by the eddy currents. In order to demonstrate experimentally the effect of the surface roughness, two families of wires covered with a zinc skin by electrolytic deposition, having very different core wire surface roughnesses, were experimented on. The mean surface roughness $R_a$ of the first family is 0.53 µm, whereas that of the second family is 1.8 µm. The results of the measurements taken at 1 MHz on these two families of galvanized wires are presented in FIG. 4. It is seen that the y-intercept increases with the value of $R_a$. The experimental linear relationship, taking into account the surface roughness, between the thickness $e_{chem}$ of the zinc layer determined by chemical means and the product $e^*\sigma_1$ determined using eddy currents is given below:

$$e_{chem} = \frac{\sigma_1 * e}{14.949 * 10^6} + \frac{R_a}{2} \quad (7)$$

$e_{chem}, e$ and $R_a$ in meters $\sigma_1$ in $S/m$

Figure 5:
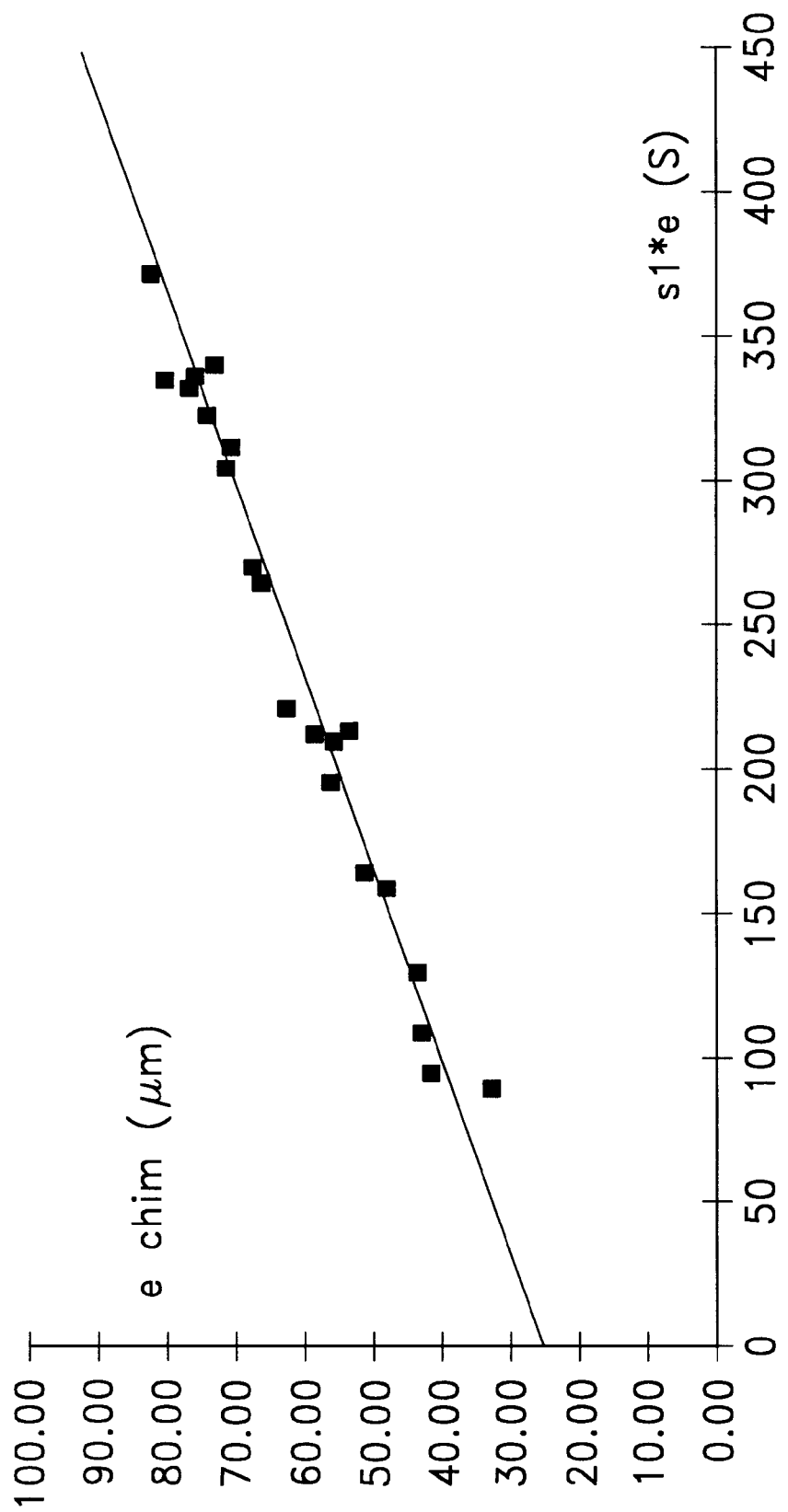
FIG. 5 represents the results of the eddy-current measurements of the thickness of the internal zinc layer of hot-galvanized tubes.

As can be seen in FIG. 5, when there is an intermediate intermetallic alloy layer between the ferromagnetic substrate and the non-ferromagnetic covering layer, a higher value of the y-intercept is observed, which is related to the presence and thickness of this intermetallic layer.

Figure 6:
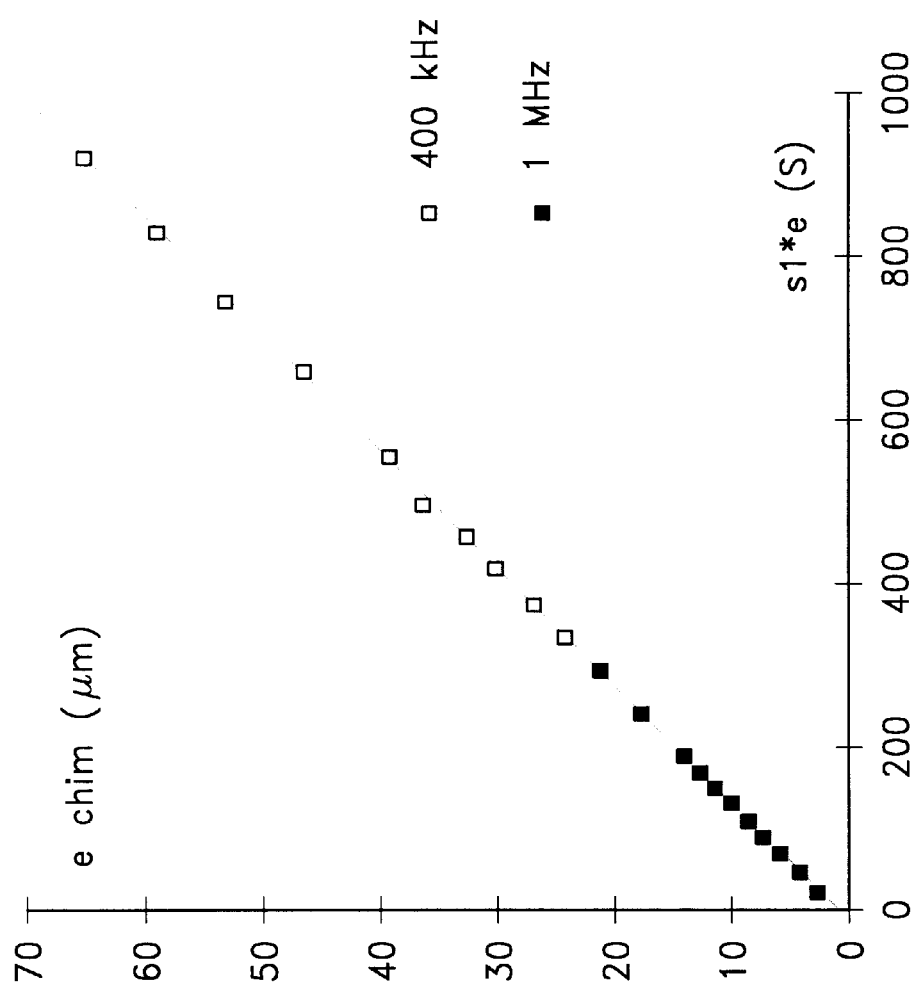
FIG. 6 represents the measurement of the thickness of the galvanization layer on 21 wires galvanized by electrolytic deposition in the same bath.

FIG. 6 deals with the results of measuring the thickness of the galvanization layer on 21 wires galvanized by electrolytic deposition in the same bath. It illustrates the linear relationship between the chemical thickness $e_{chem}$ of the zinc layer and the product $e^*\sigma_1$ determined using eddy currents. The fact that the measurement method is applicable both for very slender thicknesses (for example 0.5 µm) and for much larger thicknesses (for example 1 mm) was experimentally checked.

The electromagnetic measurements on the very thin layers were taken at a frequency of 1 MHz, whereas the measurements on the thicker layers were taken at a frequency of 400 kHz. A linear relationship according to the following equation, in which an apparent surface roughness of 1.6 µm appears, is observed in FIG. 5.

$$e_{chem} = \frac{\sigma_1 * e}{14.949 * 10^6} + \frac{1.6 * 10^{-6}}{2} \quad (8)$$

As we have shown above, magnetizing the galvanized wires produces a very significant displacement of the point corresponding to the measurement in the normalized impedance diagram. Nevertheless, as shown by Table 1 which relates to the results of the measurements, the magnetization of the galvanized wires has virtually no effect on the value of the product $e^*\sigma_1$ determined using eddy currents.

It is therefore possible to determine absolutely, that is to say without calibration, the product of the thickness e of the zinc layer times the conductivity of zinc, that is to say $e^*\sigma_1$, as well as the ratio between the relative permeability $\mu_{r2}$ of the core wire and its conductivity $\sigma_2$, that is to say $\mu_{r2}/\sigma_2$. It is not therefore necessary to know the conductivity $\sigma_2$ and the relative permeability $\mu_{r2}$ of the steel core wire. This point is very important because these quantities are never known in advance. It allows the method to be applied industrially. It should furthermore be noted that workshop experiments in the case of galvanized wires have shown that the measurement is virtually uninfluenced by the movement of the product, by the speed of movement and variations therein and the off-centering of the wire in the measurement coil. It has also been possible to observe substantial insensitivity of the measurement to practical variations in the diameter of the core wire from the nominal diameter. The thickness e of the layer can thus be determined with an accuracy of a few tenths of microns, provided that the conductivity of the non-ferromagnetic conductive metal of the covering layer is known.

Figure 7:
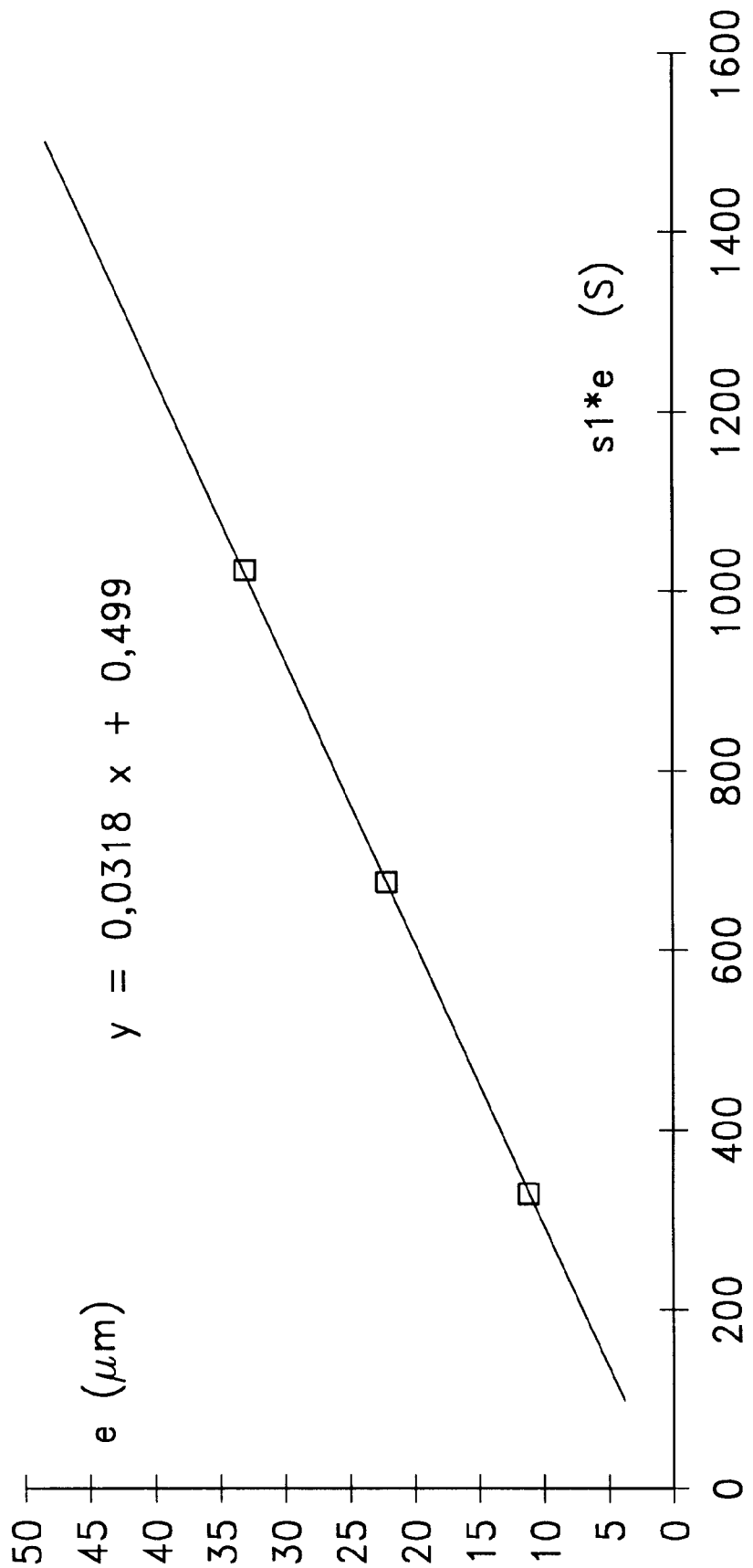
FIG. 7 represents the comparison between the electromagnetic measurement of $e^*\sigma_1$ and the real thickness e in the case of 11 $\mu$m aluminium films superposed on a ferromagnetic planar conductive substrate.

FIG. 7 relates to experimental results obtained when covering a 1 mm thick steel sheet with 1, 2 and 3 aluminium films each having a thickness of 11 µm. FIG. 7 represents the linear relationship between the thickness e of the aluminium covering layer and the product $e^*\sigma_1$ determined using eddy currents by taking the measurement with the aid of an excitation carried out using a spiral plane coil.

The question of the effect of magnetization on the result of the measurement is a difficult one. We have been able to observe that magnetization of the electrolytically zinc-plated wires with a diameter of 2.2 mm had no effect on the value of the product $e^*\sigma_1$ using the method of the patent, even though this magnetization greatly increases the permeability of the steel core wire. However, tests carried out on wires with a diameter of 5.5 mm showed the appearance of a slight effect on the product by the magnetization. The interpretation of these effects which we give, which are not allowed for by the model developed, is that a hysteresis effect is involved. Indeed, the physical model which we have employed is based on the form of Maxwell's equations which is applicable to the case of homogeneous, isotropic and linear conductive media. The model does not therefore encompass hysteresis losses which increase the energy dissipated. When the effects attributed to hysteresis have an exaggerated effect on the measurement as regards the expected accuracy, it will be advantageous to magnetize the product during the measurement using magnets or using a suitable coil.

We have therefore discovered, by analyzing the hidden physical properties of cylindrical current sheets and spiral plane coils that, at sufficiently high frequency, the complex impedance Z of a coil which creates eddy currents in an object made of a ferromagnetic conductive material covered with a covering layer of a non-ferromagnetic conductive material, is a function of the geometry of the coil+product system, of the frequency and of the variables $e^*\sigma_1$ and $\mu_{r2}/\sigma_2$, as indicated by the following two formulae:

$$L = \text{function (geometry of the ``coil+product'' system}, f, e, e^*\sigma_1, \mu_{r2}/\sigma_2) \quad (9)$$

$$R = \text{function (geometry of the ``coil+product'' system}, f, e^*\sigma_1, \mu_{r2}/\sigma_2) \quad (10)$$

These noteworthy properties are linked with the skin effect in a ferromagnetic conductive substrate covered with a layer of a coating of non-ferromagnetic conductive material.

The noteworthy properties collated in Equations (9) and (10) can therefore be generalized to the general case of any coil in the vicinity of a product of any shape made of a ferromagnetic material covered with a non-ferromagnetic conductive coating layer.

Experiments have, however, shown us the possibility of applying the method of the invention to measuring the layer thickness of a ferromagnetic conductive coating such as nickel on a ferromagnetic conductive substrate such as steel, while obtaining an accuracy which is sufficient for industrial requirements. Nevertheless, in this particular case the method provides a quantity which is proportional to the layer thickness, with the proportionality coefficient no longer being the electrical conductivity of the coating material. Notwithstanding, in this case the measurement retains the property of not being influenced by a variation in the conductivity and/or permeability of the ferromagnetic substrate.

We have described above the noteworthy properties of a measurement coil through which an alternating current flows, this coil being located in the vicinity of an object consisting of a substrate made of ferromagnetic conductive material covered with a coating layer of non-ferromagnetic conductive material.

When implementing the invention, it is advantageous to design excitation coils in the vicinity of which the field H is as uniform as possible, and it is also advantageous to arrange the detector in a region neighbouring the conductive object in which the field H is as uniform as possible.

The excitation current in the inductor coil cannot be a direct current. It must be a variable current such as, for example, without implying any limitation, a pulsed current or a sinusoidal, square-wave or sawtooth periodic current.

The detector may be the inducing coil, as in the examples presented above. It may consist of a second coil which is independent of the inductor. It may consist of any device which is sensitive to a time-variation of the flux in at least one bounded detection surface. It is advantageous to carry out the detection using a different coil from the excitation coil because it is thus possible to avoid the effects of temperature on the electrical resistance of the wires forming the coils.

The minimum frequency of the useful part of the variable magnetic field produced by the inductor is chosen such that, above this frequency, for a fixed frequency, for a defined inductor/object/detector geometry and for all the likely values of conductivity and permeability of the substrate as variable parameters, the area contained between the two extreme curves of the family of curves having as fixed parameter a value of the product of the layer conductivity times the layer thickness, and the area contained between the two extreme curves of another family of curves having another value of the fixed parameter, differing from the preceding value by the difference characterizing the desired measurement accuracy for the layer thickness, do not overlap in the region of the chart employed for the measurements.

The maximum frequency of the useful part of the variable magnetic field produced by the inductor is chosen such that, from the minimum frequency to this maximum frequency, for a fixed frequency, for a defined inductor/object/detector geometry and for all the likely values of conductivity and permeability of the substrate as variable parameters, the area contained between the two extreme curves of the family of curves having as fixed parameter a value of the product of the layer conductivity times the layer thickness, and the area contained between the two extreme curves of another family of curves having another value of the fixed parameter, differing from the preceding value by the difference resulting from the uncertainties affecting the measurements of the two quantities, do not overlap in the region of the chart employed for the measurements.

A particularly advantageous application of the invention, consisting in the on-line measurement of the thickness of the zinc or brass layer in the case of steel wires covered electrolytically or by hot immersion, resides in the method and/or the installation applicable to steel core wires with a diameter ranging from 0.1 mm to 10 mm, for example. The application of the method and/or installation of the invention is particularly beneficial in the case of a very small thickness of zinc or zinc alloy, such as brass, such as a thickness of one micrometre, for example, as well as in cases which require very high accuracy, such as an accuracy of the order of two hundredths of a micron for a zinc or brass layer with a thickness of one micron.

| | | measurement before magnetization | | | | measurement with magnetization H = 3300 A/m | | | |
|---|---|---|---|---|---|---|---|---|---|
| No. | chem µm | $\sigma_1 \ast e$ S | $\mu_{r2}/\sigma_2$ m/MS | e eddy curr. µm | difference µm | $\sigma_1 \ast e$ S | $\mu_{r2}/\sigma_2$ m/MS | e eddy curr. µm | difference µm |
| 0 | 2.8 | 24.2 | 17.8 | 2.47 | 0.33 | 27.02 | 6.20 | 2.67 | 0.13 |
| 1 | 4.2 | 47.0 | 16.5 | 4.05 | 0.15 | 49.62 | 5.71 | 4.23 | −0.03 |
| 2 | 5.8 | 70.2 | 16.4 | 5.65 | 0.15 | 74.00 | 5.56 | 5.91 | −0.11 |
| 3 | 7.2 | 90.9 | 17.3 | 7.07 | 0.13 | 94.99 | 5.65 | 7.36 | −0.16 |
| 4 | 8.4 | 110.1 | 17.0 | 8.40 | 0.00 | 115.1 | 5.61 | 8.74 | −0.34 |
| 5 | 9.8 | 136.2 | 17.5 | 10.20 | −0.4 | 142.2 | 6.35 | 10.6 | −0.81 |
| 6 | 11.4 | 151.0 | 16.6 | 11.22 | 0.18 | 155.8 | 5.56 | 11.5 | −0.15 |
| 7 | 12.5 | 167.3 | 16.7 | 12.34 | 0.16 | 172.6 | 5.09 | 12.7 | −0.21 |
| 8 | 13.9 | 191.0 | 16.9 | 13.98 | −0.1 | 197.7 | 5.92 | 14.4 | −0.54 |
| 9 | 17.6 | 242.5 | 15.7 | 17.54 | 0.06 | 245.2 | 5.25 | 17.7 | −0.12 |
| 10 | 21.1 | 298.2 | 18.6 | 21.38 | −0.3 | 305.9 | 6.00 | 21.9 | −0.81 |

We claim:

1. Method, applicable to an object consisting of a substrate made of ferromagnetic electrically conductive material covered with a layer of a non-ferromagnetic electrically conductive coating, for measuring the product of the layer conductivity times the layer thickness, consisting in placing at least one inductor producing a variable magnetic field in a space neighbouring the object, in measuring, by means of a detector consisting of at least one bounded detection surface, two quantities proportional to the parts of the time derivative of the magnetic flux created in the detection surface concomitantly by the inductor and by the object, in phase and in quadrature with a reference electrical signal, in concomitantly employing two different functions of these two measurements by defining an experimental point by taking these two functions as the two input quantities of a first chart which cannot be reduced to an equivalent chart with a single input, which is independent of the conductivity of the layer and of the conductivity and the permeability of the substrate, but is dependent on the characteristics of the inductor/object/detector system and on the variable magnetic field produced by the inductor, the said chart consisting of a network of non-secant curves which each correspond to a different value of the product of the layer conductivity times the layer thickness, and in determining on the chart which of these curves passes through the point corresponding to the measurement and deducing therefrom the value of the product of the layer conductivity times the layer thickness.

2. Method according to claim 1, characterized in that the position of the experimental point in a second two-input chart is also used for determining the quotient of the conductivity of the substrate divided by the permeability of the substrate by employing this second two-input chart superposed with the first chart which cannot be reduced to an equivalent chart with a single input, which consists of a second network of non-secant curves which each correspond to a different value of the said quotient, which is independent of the conductivity of the layer and of the conductivity and the permeability of the substrate but is dependent on the particular geometry of each inductor/object/detector system, and in determining on the second chart which of these curves passes through the point corresponding to the measurement and deducing therefrom the value of the quotient of the permeability of the substrate divided by the conductivity of the substrate.

3. Method according to claim 2, characterized in that the inductor is an excitation coil.

4. Method according to claim 3, characterized in that the excitation coil is fixed in the space neighbouring the conductive object and is supplied with variable current.

5. Method according to claim 4, characterized in that the variable current is a fixed-frequency alternating current.

6. Method according to claim 5, characterized in that the alternating current is sinusoidal.

7. Method according to claim 4, characterized in that the variable current is a pulsed current.

8. Method according to claim 4, characterized in that the two measured quantities are two independent components of the complex impedance, at the frequency of the excitation current, of the excitation coil located in the space neighboring the object.

9. Method according to claim 5, characterized in that the two measured quantities are two independent components of the complex impedance, at the frequency of the excitation current, of the excitation coil located in the space neighboring the object.

10. Method according to claim 6, characterized in that the two measured quantities are two independent components of the complex impedance, at the frequency of the excitation current, of the excitation coil located in the space neighboring the object.

11. Method according to claim 1, characterized in that the inductor is an excitation coil.

12. Method according to claim 11, characterized in that the excitation coil is fixed in the space neighboring the conductive object and is supplied with variable current.

13. Method according to claim 12, characterized in that the two measured quantities are two independent components of the complex impedance, at the frequency of the excitation current, of the excitation coil located in the space neighboring the object.

14. Method according to claim 12, characterized in that the variable current is a fixed-frequency alternating current.

15. Method according to claim 14, characterized in that the two measured quantities are two independent components of the complex impedance, at the frequency of the excitation current, of the excitation coil located in the space neighboring the object.

16. Method according to claim 14, characterized in that the alternating current is sinusoidal.

17. Method according to claim 14, characterized in that the two measured quantities are two independent components of the complex impedance, at the frequency of the excitation current, of the excitation coil located in the space neighboring the object.

18. Method according to claim 12, characterized in that the variable current is a pulsed current.

19. Method according to any one of the preceding claims, characterized in that the minimum frequency of the useful part of the variable magnetic field produced by the inductor is chosen such that, above this frequency, for a fixed frequency, for a defined inductor/object/detector geometry and for all the likely values of conductivity and permeability of the substrate as variable parameters, the area contained between the two extreme curves of the family of curves having as a fixed parameter, a value of the product of the layer conductivity times the layer thickness, and the area contained between the two extreme curves of another family of curves having another value of the fixed parameter, differing from the preceding value by the difference characterizing the desired measurement accuracy for the layer thickness, do not overlap in the region of the chart employed for the measurements.

20. Method according to claim 1, characterized in that the maximum frequency of the useful part of the variable magnetic field produced by the inductor is chosen such that, from the minimum frequency to this maximum frequency, for a fixed frequency, for a defined inductor/object/detector geometry and for all the likely values of conductivity and permeability of the substrate as variable parameters, the area contained between the two extreme curves of the family of curves having as a fixed parameter a value of the product of the layer conductivity times the layer thickness, and the area contained between the two extreme curves of another family of curves having another value of the fixed parameter, differing from the preceding value by the difference resulting from uncertainties affecting the measurements of the two quantities, do not overlap in the region of the chart employed for the measurements.

21. Method according to claim 20, characterized in that the two measured quantities are proportional to the amplitude and the phase of the signal delivered by the detector with respect to a reference electrical signal.

22. Method according to claim 20, characterized in that the object is subjected to an invariant magnetic field during the measurement.

23. Method according to claim 20, characterized in that it is carried out in real time.

24. Method according to claim 20, characterized in that the detector consists of a coil with at least one turn.

25. Method according to claim 20 wherein:
said layer of coating of a non-ferromagnetic conductive material is chosen from a group consisting of: tin, brass, zinc, gold, and silver; and
said substrate made of ferromagnetic conductive material is chosen from a group consisting of: a wire, a metal sheet, a tube, a section, a flat product, any object bounded by a cylindrical surface, and any object bounded by a plane surface.

26. Method according to claim 20 further comprising determining a surface roughness of the substrate by comparing the value of conductivity times thickness of the layer with a chemical measurement of the thickness of the layer of non-ferromagnetic conductive material.

27. Method according to claim 20 further comprising determining a thickness of an intermetallic alloy layer separating the substrate from the layer of non-ferromagnetic conductive material by comparing a value of conductivity times thickness of the layer with a chemical measurement of the thickness of the layer of non-ferromagnetic conductive material.

28. Method according to claim 1, characterized in that the two measured quantities are proportional to the amplitude and the phase of the signal delivered by the detector with respect to a reference electrical signal.

29. Method according to claim 1, characterized in that the object is subjected to an invariant magnetic field during the measurement.

30. Method according to claim 1, characterized in that it is carried out in real time.

31. Method according to claim 1, characterized in that the detector consists of a coil with at least one turn.

32. Method according to claim 1 wherein:
said layer of coating of a non-ferromagnetic conductive material is chosen from a group consisting of: tin, brass, zinc, gold, and silver; and
said substrate made of ferromagnetic conductive material is chosen from a group consisting of: a wire, a metal sheet, a tube, a section, a flat product, any object bounded by a cylindrical surface, and any object bounded by a plane surface.

33. Method according to claim 1 further comprising determining a surface roughness of the substrate by comparing the value of conductivity times thickness of the layer with a chemical-measurement of the thickness of the layer of non-ferromagnetic conductive material.

34. Method according to claim 1 further comprising determining a thickness of an intermetallic alloy layer separating the substrate from the layer of non-ferromagnetic conductive material by comparing a value of conductivity times thickness of the layer with a chemical measurement of the thickness of the layer of non-ferromagnetic conductive material.

35. Method in accordance with claim 1, wherein the method is performed by an installation for measuring a thickness of a layer of non-ferromagnetic conductive material on an object comprising a substrate made of ferromagnetic conductive material, said object moving continuously past/through a measuring device comprising an inductor which produces a variable magnetic field in a space neighboring the object, a detection system comprising a detector comprising at least one bounded detection surface, at least one of the inductor or the detection system being connected to a computer programmed to carry out a measurement.

36. Method according to claim 35 wherein:
said layer of coating of a non-ferromagnetic conductive material is chosen from a group consisting of: tin, brass, zinc, gold, and silver; and
said substrate made of ferromagnetic conductive material is chosen from a group consisting of: a wire; a metal sheet; a tube; a section; a flat product; any object bounded by a cylindrical surface; and any object bounded by a plane surface.

37. Method according to claim 35 further comprising determining a surface roughness of the substrate by comparing the value of conductivity times thickness of the layer with a chemical measurement of the thickness of the layer of non-ferromagnetic conductive material.

38. Method according to claim 35 further comprising determining a thickness of an intermetallic alloy layer separating the substrate from the layer of non-ferromagnetic conductive material by comparing a value of conductivity times thickness of the layer with a chemical measurement of the thickness of the layer of non-ferromagnetic conductive material.

* * * * *